Feb. 15, 1955
M. P. SCHMIDT
LIGHT-SENSITIVE PHOTOGRAPHIC ELEMENT AND
PROCESS OF PRODUCING PRINTING PLATES
Filed June 8, 1951
2,702,243
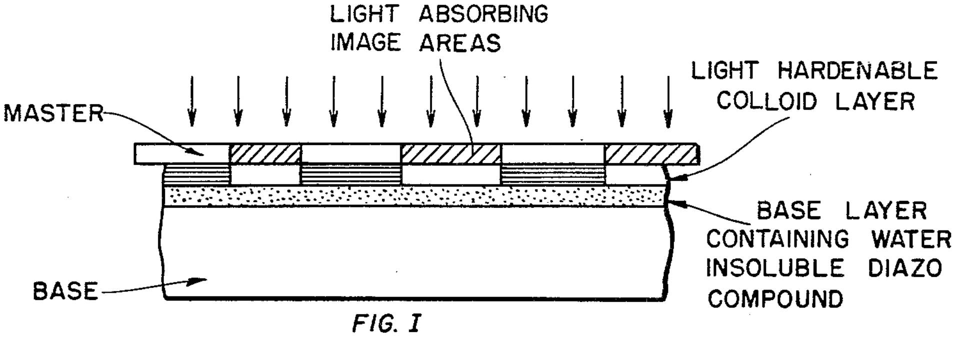
FIG. I
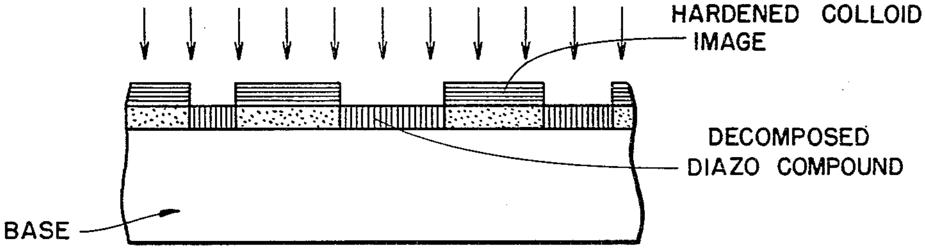
FIG. II
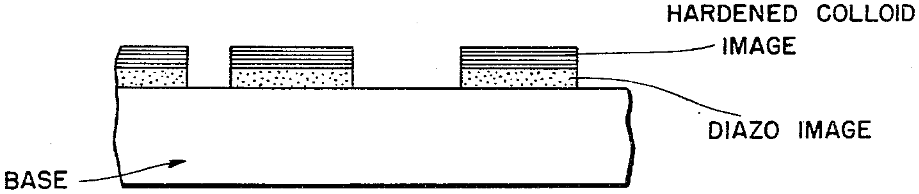
FIG. III
INVENTOR
MAXIMILIAN PAUL SCHMIDT
BY
J. Russell Juten
ATTORNEY United States Patent Office 2,702,243
Patented Feb. 15, 1955

2,702,243

LIGHT-SENSITIVE PHOTOGRAPHIC ELEMENT AND PROCESS OF PRODUCING PRINTING PLATES

Maximilian Paul Schmidt, Wiesbaden-Biebrich, Germany, assignor, by mesne assignments, to Azoplate Corporation, Summit, N. J., a corporation of New Jersey Application June 8, 1951, Serial No. 230,465

Claims priority, application Germany June 17, 1950

15 Claims. (Cl. 95—8)

The present invention relates to the production of light-sensitive materials suitable for use in the graphic industry. More particularly, it relates to a negative-working light sensitive material which may include a dimensionally stable base such as a metal, glass or stone base. The light sensitive materials applied to the base are relatively stable so that the material may be supplied commercially in the form of pre-sensitized plates. The images obtained depending on the base material can be used advantageously for making printing plates suitable for planographic relief or intaglio printing. The images are durable so that a large number of copies can be printed from a printing plate produced from the light sensitive material of the invention. The images also resist etching acids which makes them suitable for use on glass or stone for example.

Negative-working water insoluble diazo compounds when used alone or in combination with colloids do not provide light sensitive layers of good stability on metallic bases. The present invention makes use of water insoluble diazo compounds which originally work positively but which are covered by a negative-working light-sensitive colloid layer in order to reverse the process.

The new light sensitive material of the invention and one method of using it will be more fully understood by reference to the accompanying diagrammatic drawing, in which:

Fig. I is a view in sectional elevation showing the new light sensitive material being exposed to a light image.

Fig. II is a view in sectional elevation showing the material of Fig. I after the initial development being exposed uniformly to actinic light.

Fig. III is a view in sectional elevation showing the material of Fig. II after the second development.

As shown in Fig. I, the new light sensitive material is made up of a base which as has been described may be a dimensionally stable base such as a metal, glass or stone base. A base layer containing a water insoluble diazo compound which may be decomposed by light is coated on the base and a light hardenable colloid layer is coated on the base layer. In the method of exposing the material illustrated in Fig. I a transparent master having light absorbing image areas which for example could be an ordinary photographic negative is placed in contact with the light hardenable colloid layer and the material is thus exposed to light through the master. Those areas of the colloid layer which are not protected by the light absorbing image areas of the master are hardened by the light whereas those areas of the colloid layer which are protected by the light absorbing image areas remain unchanged.

The master is then removed and the unhardened areas of the colloid layer are removed by treatment with water to form a hardened colloid image on the base layer as shown in Fig. II. It is advisable to color this image with some coloring matter which absorbs actinic light. This coloring of the colloid can take place right after the exposure and prior to its development with water. After washing with water, the colloid image may be dried by means of an electric dryer. Now the material is exposed completely to direct light without a master as shown in Fig. II to decompose the diazo compound in those areas of the base layer which are not protected by the hardened colloid image. The light decomposition products are removed from these areas by treatment with an alkaline solution and subsequent rinsing with water.

A diazo image remains on the base with the colloid image directly over it as shown in Fig. III.

If it should prove desirable to avoid the second exposure and the alkaline treatment, the diazo compound can be removed at the uncovered areas of the base layer by treating it with an organic solvent, for example, alcohol. A prerequisite, however, for such a procedure is the use of a hydrophilic colloid, insoluble in the aforementioned solvent. Such a colloid is for example gelatin.

The light-sensitive substance for the lower or base layer is a diazo compound, insoluble in water, which may have the constitution of an ester or acid amide of a sulfonic acid or carboxylic acid of an ortho diazo phenol of the benzene or naphthalene series; in the literature these compounds are also described as orthoquinone-diazides or naphthoquinone-(1,2)-diazide-(2) or naphthoquinone-(1,2)-diazide-(1); compare Beilstein, fourth edition, volume 16 (1933), pages 520, 522/23, and 533/34. The upper layer which is coated on this lower or base layer includes a tannable hydrophilic colloid and a substance that will bring about the tanning (hardening) of the colloid during exposure to light.

Layers of the kind represented by the upper layer (light-sensitive, tannable colloid layers) are generally known. Apart from the dichromate-colloid layers which have been used for a long time in reproduction techniques, there should be mentioned in this connection the colloid layers that became known by the specification of the French Patent No. 886,716 and contain certain azido compounds, in particular the water-soluble salts of 4,4′-diazidostilbene-3,3′-disulphonic acid. These azido compounds have proven very valuable, since they are very light-sensitive and stable and become colored when exposed to light, thus affording considerable portection from light to the light-sensitive layer lying below the colloid layer. It is also possible, however, to add to the colloid layer other compounds which have a hardening effect on colloids; for example, amino-diazo compounds of higher molecular weight as described in the specification of German Patent No. 581,697 may be used.

The light-sensitivity of the lower layer which is coated directly on the base plate derives—as explained above—from the presence of a water-insoluble diazo compound which has the constitution of an ester or acid amide of a sulfonic acid or carboxylic acid of an ortho-diazo-phenol of the benzene or naphthalene series. In the naphthalene series these compounds may be obtained for example from the sulfonic acids or carboxylic acids of 2-diazo-naphthol-(1) or 1-diazo-naphthol-(2) by esterification or amidation. Some of them have been described in the literature. The compounds whose method of production has not been disclosed in the literature as yet can be obtained for example by bringing about a reaction of the chlorides of the sulfonic acids or carboxylic acids of 2-diazo-naphthol-(1) or of 1-diazo-naphthol-(2) with hydroxy-compounds or amino compounds. Aromatic hydroxy-compounds, for example, the nucleus of which may also be substituted with halogen atoms or alkyl-, nitro-, alkoxy-, aryloxy-, alkylmercapto-, or acylamino-groups, or which may be hydrogenated, may be condensed with the sulphochlorides of 2-diazo-naphthol-(1) or of 1-diazo-naphthol-(2) sulfonic acids which are obtainable from these diazo compounds by the action of chlorosulphonic acid at 50 to 70° C. Suitable hydroxy compounds are for example phenols, naphthols, 1-nitro-2-naphthol, N-benzoyl-p-amino-phenol, N-acetyl- or N-benzoyl-1,5- or N-benzoyl-2,8-aminonaphthol, hydroxy-phenanthrenes, 2-hydroxychrysene, hydroxy-naphthoimidazoles, 4,4′-dihydroxydiphenyl-sulfone, β,β-bis-(4-hydroxyphenyl)-propane and among compounds which already have the characteristics of dyes 1- or 2-hydroxyanthraquinones may be used. It is advisable to condense the components in an aqueous solution made slightly alkaline by soda or caustic by slowly adding the alkaline substance to the mixture of the diazosulpho-chlorides and the hydroxy compounds. A suitable organic solvent may be used in addition.

Among the amines, the following can be used for example; primary or secondary aromatic amines or diamines, the nucleus of which may also be substituted, for example, by halogen atoms or alkoxy-groups, such as N-methylaniline, N - ethylnaphthylamine, 2,4 - dichloroaniline, p-phenetidine, p-aminodiphenylamine, aminofluorene, aminodiphenyleneoxide, dodecylamine, p-phenylene diamine, diaminodiphenylmethane, naphthylenediamine.

The higher the molecular weight of the amines used, the more suitable are in general the sulphonamides of the diazonaphthols obtained. Preference in this connection should be given to secondary amines, since an even better differentiation between the diazo compounds and their light-decomposition products in their reaction to alkali is obtainable by their use. The diazo images obtained with them are also more receptive to greasy ink. Furthermore, the diazo compounds with high molecular weight bleach better when exposed to light, thus making it possible to obtain a clear background. Moderate amounts, however, of agents which promote the bleaching of the diazo compounds, like thiourea, thiosinamine, or organic acids and dyes which have a sensitizing effect or render the reproduction more clearly visible, can be added to the diazo layer. In general, however, diazo compounds which do not bleach well and for this reason appear less suitable should be avoided.

The lower or base layer is produced by dissolving one of the diazo compounds to be used in accordance with this invention in an organic solvent, for example, in dioxane or alcohol or in a mixture of both, and by applying this solution to the base plate in the usual manner and then drying the layer. Resins soluble in alkaline solutions or higher fatty acids, or substances of proven value in positive diazotyping, for example, azo components, sensitizers, small amounts of dyes, and organic acids may be added to the lower or base layer.

The positive image shown in Fig. III obtained from the negative master of Fig. I can be processed further according to the requirements to be met by the printing plate. If, for example, the base used is metallic, e. g., a zinc plate, the colloid image can be removed by means of alkali or of an organic solvent or by mechanical action such as brushing or rubbing it off in the presence of water and it is possible then to proceed immediately with printing from the uncovered diazo image after rubbing it over with fatty ink. If desired, the material can be heated for some time at higher temperatures, either prior to or after being rubbed over. It is also possible to rub over the image with greasy ink and then to etch it in the customary way for the purpose of producing a cliche If a large number of copies is to be made from planographic printing stocks, it is expedient not to remove the colloid image after the development with alkali, but rather to heat the material to higher temperatures and then to proceed with printing. The same procedure is to be recommended in producing cliches, in which case the printing stock is deep-etched after printing ink has been applied.

As a general rule, the light-sensitive compound contained in the colloid layer and the color resulting from the exposure of the upper colloid layer protects the lower diazo layer against light. Another means of preventing light from affecting the base layer during the exposure under the master is to interpose filters or add to the colloid layer certain compounds, for example, pigments, which should absorb as much as possible of the light to which the diazo compound contained in the base layer is sensitive.

The following examples are inserted in order to illustrate the present invention. It is not intended to limit the scope of the invention to the examples.

(1) A 1:1 mixture of dioxane (diethylenedioxide) with pyridine containing approximately 2% of the condensation product of 2 mols of 2-diazo-naphthol-(1)-5-sulpho-chloride with 1 mol of 4,4'-dihydroxy-diphenylsulfone is applied as a layer by means of a plate whirler making approximately 100 revolutions per minute to an aluminum plate which has been slightly roughened by brushing. After this diazo layer has been dried thoroughly with hot air by means of an electric dryer, an aqueous alcoholic solution containing 3% of highly viscous polyvinylpyrrolidone, 0.3% of sodium 4,4'-diazidostilbene-2,2'-disulfonate, and 0.3% of eosin (Schultz, Farbstofftabellen, 7th edition, volume 1 (1931), page 374) is superimposed by the same method as a layer coated on the diazo layer. After this second layer has become dry and has been stored over night, the sensitized side of the plate is exposed under a transparent negative to an arc lamp of 18 amperes for about 40 seconds at a distance of 70 cm. until the exposed areas of the colloid have become sufficiently hardened. Then the areas of the colloid layer which have not been struck by light are removed by spraying water on the surface and the colloid image is colored by applying a 6% solution of chrysoidine (Schultz, Farbstofftabellen, 7th edition, volume 1 (1931), page 18). After rinsing with water the plate is dried and then exposed again without a master for 1¾ minutes at a distance of 70 cm. whereby the diazo compound in the uncovered areas of the base layer is destroyed. After the light decomposition products have been washed off by the application of a 5% trisodium phosphate solution with a cotton swab and after the plate has been rinsed and the colloid image has been removed by brushing or rubbing with water, the remaining positive diazo image—acidified with 5% phosphoric acid—can be rubbed over with greasy printing ink in the customary manner and used for printing.

However, it is also possible to heat the plate, after treating it with the trisodium phosphate solution and rinsing it with water, until the colloid image has become brown or brown-black whereupon it can be etched and made ready for printing in the customary way.

The condensation product of 2 mols of 2-diazo-naphthol-(1)-5-sulpho-chloride with 1 mol of 4,4'-dihydroxy-diphenylsulfone probably has the formula

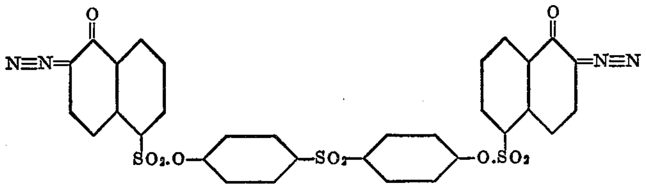

It is produced in the following way:

25.2 parts of 4,4'-dihydroxy-diphenylsulfone are dissolved in 200 cc. of dioxane and 100 cc. of water. Then 260 cc. of a 10% soda solution are added. To this solution there is added a hot solution of 60 parts of 2-diazo-naphthol-(1)-5-sulfo-chloride in 250 parts of dioxane. After cooling a yellow crystalline compound precipitates, which is filtered off, neutralized by washing with water, and dried. When recrystallized from dioxane this compound precipitates in the form of coarse crystals which carbonize at approximately 300° C. when heated gradually.

(2) In the same manner as described in Example 1 a diazo layer is coated onto an aluminum foil, the surface of which has been anodically oxidized. To this layer there is applied an aqueous solution containing 3% of highly viscous polyvinyl alcohol and 0.3% of the condensation product of p-diazo-diphenyl-amine-sulphate with paraformaldehyde (see German Patent No. 596,731). After drying, the material is exposed as described in Example 1; then the colloid image is developed and colored with a 6% solution of the dyestuff "Siriuslightorange GL." After being rinsed with water the material is dried and re-exposed without a master until the diazo compound in the uncovered areas of the base layer has just been destroyed. After the diazo compound which has been decomposed by light has been washed off with a 3% solution of trisodium phosphate, the colloid image is removed by brushing with water. Then the underlying diazo image is wiped with 1% phosphoric acid and rubbed over with lithographic ink. The printing form thus obtained can be used for printing in the customary way.

(3) To a granulated zinc plate, previously treated with a 5% solution of alum, there is applied as described in Example 1 the same kind of diazo solution and on top of this the same light-sensitive colloid solution. The dried, sensitized surface is exposed to a lamp as described in Example 1 under a clear transparent negative until the colloid has hardened sufficiently; about 20 to 40 seconds are sufficient in this case. The colloid not struck by light is sprayed off with water and the remaining positive colloid image is colored with a 10% solution of naphthol-green B (Schultz, Farbstofftabellen, 7th edition, volume 1 (1931), page 7). After being rinsed with water, the layer is dried and exposed without a master for 1¾ minutes; then the decomposed parts of the diazo layer and the colloid image are removed as described in Example 1. The remaining positive diazo image is treated with a five percent solution of acid salts, for example, the solution described by Strecker in the Germany Patent No. 642,782, and then rubbed over with lithographic ink.

(4) To a polished zinc plate, scoured with pumice stone powder and then slightly etched with 2% nitric acid and subsequently dried, there are applied in the previously described manner 100 cc. of dioxane containing three grams of 2-diazo-naphthol-(1)-5-sulfonic acid N-ethyl-α-naphthylamide which is obtained by condensation of 2-diazo-naphthol-(1)-5-sulfo-chloride with N-ethyl-α-naphthylamine and 1.5 grams of shellac. The diazo layer is coated as described in Example 1 with the same kind of light-sensitive colloid solution and then the surface layer is exposed to light beneath a transparent negative until a sufficient hardening of the colloid areas struck by light has just been achieved. The colloid image is developed by being sprayed with water and is then colored with a 3% solution of the dyestuff "Siriuslight-orange GL." After being rinsed with water and dried, the material is exposed without a master for about 2½ minutes and further processed as described in Example 3. It is rubbed over with greasy ink and the plate bearing the positive image can be deep-etched in the customary manner.

(5) An electrolytically oxidized aluminum foil is coated with two layers as described in Example 1, except that the colloid solution contains in addition 0.2% of auramine (Schultz, Farbstofftabellen, 7th edition, volume 1 (1931), page 307). Then the sensitized side is exposed under a transparent negative, one minute being required with the lamp mentioned in Example 1, and is dried after the colloid areas not struck by light have been removed with water. Now the second exposure follows as in the previously described examples and the base-layer areas in which the diazo compound is decomposed are removed with a 3% solution of trisodium phosphate. There remains a clearly visible yellow colloid image that can be made ready for printing in the manner described in Example 1.

(6) To a slightly roughened aluminum plate covered with the same diazo layer as in Example 1 there is applied by whirling a solution containing about 5% of fish glue and 2% of diazidostilbenedisulfonic acid sodium salt. After this layer has been dried, the plate is exposed under a master for one minute to the same lamp as described in Example 1 and the colloid image is developed with water and colored with a 6% solution of chrysoidine (Schultz, Farbstofftabellen, 7th edition, volume 1 (1931), page 18). Then the foil is rinsed with water and made ready for printing in the manner described in Example 1 by renewed exposure without the master, followed by washing with a 3% solution of trisodium phosphate and by the removal of the colloid image.

The fish-glue layer, however, may contain silver chloride in addition. In this case it is possible, subsequent to the exposure, to develop by means of a metol-hydroquinone developer a black silver image which affords good opacity during the second exposure thus making it unnecessary to color the colloid image.

(7) To a superficially oxidized aluminum plate the same diazo compound as in Example 1 is applied as a layer. On this diazo layer there is superimposed by whirling a 6% solution of gelatin containing 0.1% of auramine (Schultz, Farbstofftabellen, 7th edition, volume 1 (1931), page 307) and 0.6% of diazidostilbene-disulfonic acid sodium salt. After the layer has been dried, it is exposed under a negative; one minute being required with the same lamp as in Example 1. Subsequently it is washed with water and those areas of the underlying diazo layer which correspond with the areas of the top colloid layer which were not struck by light are laid bare. After drying these uncovered parts of the diazo base layer are then removed with an alcohol-acetone mixture (1:1) by wiping with a cotton swab. The remaining image can be used for printing in the customary way. It is also possible, however, to heat it first as in Example 1 or to remove the colloid layer on top of the diazo image by brushing with water and to use the remaining diazo image for printing.

(8) A mechanically roughened aluminum plate is whirl-coated with a monomethylglycolether solution containing 2% of 6-methyl-benzoquinone-(1,2)-diazide-(2)-4-(N,N-diphenyl)-sulfonamide of the formula

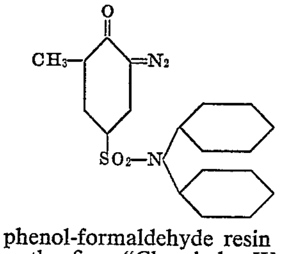

and 1% of a phenol-formaldehyde resin (novolak) sold in Germany by the firm "Chemische Werke Albert" at Wiesbaden-Biebrich (Germany) under the name "Alnovol" (registered trade mark in Germany). After the layer has been dried, a 33% alcoholic light-sensitive colloid solution is coated onto the coated side of the plate. Further treatment is as described in Example 1, except that the colloid image is colored with a 10% solution of naphthol green B (compare Example 3) and finally the lower layer is developed with a 3% solution of trisodium phosphate. After the colloid image has been removed by brushing, the plate is treated with a 1% solution of phosphoric acid and the diazo image is rubbed in with greasy printing ink.

The diazo compound may be prepared from 6-methly-2-amino-1-hydroxy-benzene-4-sulfonic acid which, according to the well-known process, is converted into 6-methylbenzoxazolone-5-sulfochloride, having a melting point of 198°–200° C., by way of 6-methylbenzoxazolone-5-sulfonic acid which is treated with phosphorpentachloride. The chloride thus obtained is heated to a temperature of 150° C. with an excess of diphenylamine and yields a melt that finally solidifies. In order to purify the reaction product, the melt is finely divided and thoroughly mixed with alcohol. The solid particles are filtered off and washed again with alcohol. The thus obtained 6-methylbenzoxazolone-5-sulfon-N,N-diphenylamide with a melting point of 223°–233° C. is saponified to 6-methyl-2-amino-phenol-4-sulfon-N,N-diphenyl-amide by heating it with a 20% solution of caustic soda. The compound is purified by diluting the alkaline solution and treating it with animal charcoal. After filtration the sulfonamide is precipitated as the hydrochloride. By diazotization in a highly diluted aqueous solution the 6-methyl-benzoquinone-(1,2)-diazide-(2)-4-sulfon-N,N-diphenyl-amide is obtained.

(9) A superficially oxidized aluminum plate is coated with a 2% solution of the condensation product of 2 mols of 2-diazonaphthol-(1)-5-sulfochloride and 1 mol of metol in dioxane. An aqueous emulsion that contains about 5–7% of Le Page's fish-glue, 2% of diazidostilbene-disulfonic acid sodium salt, and about 7% of silver chloride is whirlcoated onto the dried layer. After drying, the layer is exposed under a negative until the areas struck by light have hardened to such an extent that their adhesion to the underlying layer is high enough so that the colloid image will not be removed when the aluminum plate is subsequently sprayed with water. The colloid image obtained after rinsing with water is transformed into a black silver image by bathing it for a short time in a metol-hydroquinone developer. After being rinsed with water once more the plate is dried and the top side of the image is uniformly re-exposed to light until the diazo compound is destroyed in the areas not covered by the silver image. The light decomposition product is removed by a treatment with a 3% trisodiumphosphate solution, whereby the black positive silver colloid image disappears, thus laying bare the underlying diazo image. After rinsing with water and after suitable acidification the image can be used for printing.

Instead of the above mentioned diazo compound which may be prepared, in a similar manner to the method described in Example 1, by condensation of 2 mols of 2,1-diazonaphthol-5-sulfochloride with 1 mol of metol (1,2-monomethylaminophenol) in dioxane in the presence of a soda solution at a temperature of about 40°–45° C., the condensation product of 1 mol of 7-hydroxy-naphthalene-1-biguanide and 3 mols of 2-diazonaphthol-(1)-5-sulfochloride, which may be prepared in the same way, can also be applied.

(10) A thin layer is produced on a superficially oxidized aluminum plate by coating with a 2% solution of 2-diazonaphthol-(1)-4,7-di-(sulfonic acid-N-ethylanilide) with the formula

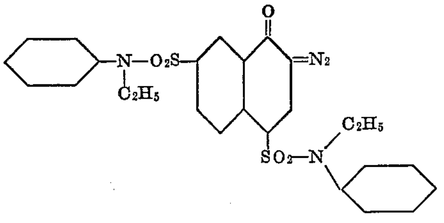

in monomethylglycolether in the customary manner. After drying, this layer is coated with a colloid layer containing silver as is described in Example 9. The thus obtained light sensitive plate can be used and further treated in the same way as described in Example 9.

In order to prepare the diazo compound, one may start from 1-naphthol-4,7-disulfonic acid which is converted into the sodium salt of the 1-benzene sulfonic acid ester of 1-hydroxynaphthalene-4,7-disulfonic acid by condensation with benzene sulfonic acid chloride in a soda alkaline solution. By heating the condensation product with phosphorpentachloride on an oilbath to a temperature of 130° C. the disulfochloride is formed which melts at a temperature of 144° C. On heating with 4 moles of monoethylaniline in dioxane this disulfochloride is transformed into the benzene sulfonic acid ester of 1-hydroxynaphthalene-4,7-di-(sulfonic acid-N-ethylanilide). This compound is saponified by boiling four hours with 8% caustic soda to 1-hydroxynaphthalene-4,7-di-(sulfonic acid-N-ethylanilide) and the last-mentioned compound is converted into an azo dye by coupling with diazotized aniline in aqueous dioxane. This azo dye melts at 120° C. after recrystallization from aqueous alcohol. The dyestuff can be reduced to the 2-amino-1-hydroxy-naphthalene-4,7-di-(sulfonic acid-N-ethylanilide) with the aid of hydrosulfite and caustic soda which finally renders 2-diazonaphthol-(1)-4,7-di-(sulfonic acid-N-ethylanilide) by diazotization in glacial acetic acid. The yellow compound decomposes at about 141° C.

Having thus described the invention what I claim is:

1. As a new article of manufacture light sensitive material for use in making printing plates comprising a base, a light sensitive base layer coated on said base comprising a water insoluble diazo compound selected from the group consisting of aromatic sulfonic acid esters, aromatic sulfonamides, aromatic carboxylic acid esters and aromatic carboxylic acid amides of ortho-quinone-diazides of the benzene and the naphthalene series and a second layer coated on said base layer comprising a water soluble organic colloid and a light sensitive substance selected from the group consisting of formaldehyde condensation products of amino diazo compounds and azido compounds.

2. The article of claim 1 wherein the water soluble organic colloid is selected from the group consisting of polyvinylpyrrolidone, polyvinylalcohol, fish glue and gelatine.

3. The article of claim 1 wherein the light sensitive substance of the second layer is a diazido stilbene compound with symmetrically arranged azido groups in the molecule.

4. The article of claim 1 wherein the light sensitive substance of the second layer is sodium-4,4'-diazido-stilbene-2,2'-disulfonate.

5. The article of claim 1 wherein the light sensitive substance of the second layer is an amino diazo compound of high molecular weight.

6. The article of claim 1 wherein the light sensitive substance of the second layer is the formaldehyde condensation product of para-diazo-diphenylamine-sulfate.

7. The article of claim 1 wherein the second layer comprises polyvinylpyrrolidone and sodium-4,4'-diazido-stilbene-2,2'-disulfonate.

8. The process of producing printing plates from a light sensitive material comprising a base, a diazo layer containing a water insoluble diazo compound selected from the group consisting of aromatic sulfonic acid esters, aromatic sulfonamides, aromatic carboxylic acid esters and aromatic carboxylic acid amides of ortho-quinone diazides of the benzene and naphthalene series coated on said base and a water soluble organic colloid layer containing a light sensitive substance selected from the group consisting of formaldehyde condensation products of amino diazo compounds and azido compounds coated on said diazo layer, comprising the steps of exposing the material to a light image, removing the colloid not struck by light to form a colloid image, coloring the tanned colloid, completely re-exposing the surface of the material and treating the re-exposed material with an alkaline solution to remove the decomposed diazo compound.

9. The process of claim 8 wherein said colloid image is removed by mechanical action in the presence of water following the alkaline treatment.

10. The process of producing printing plates from a light sensitive material comprising a base, a diazo layer containing a water insoluble diazo compound selected from the group consisting of aromatic sulfonic acid esters, aromatic sulfonamides, aromatic carboxylic acid esters and aromatic carboxylic acid amides of ortho-quinone diazides of the benzene and naphthalene series coated on said base and a water soluble organic colloid layer containing a light sensitive substance selected from the group consisting of formaldehyde condensation products of amino diazo compounds and azido compounds coated on said diazo layer, comprising the steps of exposing the material to a light image, removing the colloid not struck by light to form a colloid image and dissolving the diazo compound from the uncovered areas of the diazo layer by means of an organic solvent.

11. The article of claim 1 wherein the light sensitive base layer is the condensation product of 2 mols of 2 diazo naphthol-(1)-5-sulpho-chloride with 1 mol of 4,4'-dihydroxy-diphenyl-sulfone.

12. The article of claim 1 wherein the light sensitive base layer is 2-diazo-naphthol-(1)-5-sulfonic acid N-ethyl-α-naphthylamide.

13. The article of claim 1 wherein the second layer coated on said base layer consists of fish glue and a diazido-stilbene disulfonic acid sodium salt.

14. The article of claim 1 wherein the light sensitive base layer is 6-methyl-benzoquinone-(1,2)-diazide-(2)-4-(N,N-diphenyl)-sulfonamide.

15. The article of claim 1 wherein the light sensitive base layer is the condensation product of 2 mols of 2 diazo naphthol-(1)-5-sulpho-chloride with 1 mol of metol.

References Cited in the file of this patent

UNITED STATES PATENTS

| | | |
|---|---|---|
| 1,966,412 | Krieger | July 10, 1934 |
| 2,312,854 | Toland et al. | Mar. 2, 1943 |
| 2,367,420 | Mullen | Jan. 16, 1945 |
| 2,373,357 | Toland et al. | Apr. 10, 1945 |
| 2,570,262 | Newman | Oct. 9, 1951 |